(12) United States Patent
Tomofuji (10) Patent No.: US 6,662,317 B2
(45) Date of Patent: Dec. 9, 2003

(54) METHOD AND APPARATUS FOR CHROMATIC DISPERSION EQUALIZATION

(75) Inventor: Hiroaki Tomofuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/601,879

(22) PCT Filed: Mar. 19, 1999

(86) PCT No.: PCT/JP99/01424

§ 371 (c)(1),
(2), (4) Date: Aug. 9, 2000

(87) PCT Pub. No.: WO99/48231

PCT Pub. Date: Sep. 23, 1999

(65) Prior Publication Data

US 2003/0163771 A1 Aug. 28, 2003

(30) Foreign Application Priority Data

Mar. 19, 1998 (JP) .............................. 10-70654

(51) Int. Cl.⁷ ................................................ H02H 3/05
(52) U.S. Cl. ........................................ 714/48; 714/704
(58) Field of Search ............................. 714/48, 52, 57, 714/704, 758, 759; 385/1, 4

(56) References Cited

U.S. PATENT DOCUMENTS 4,864,573 A * 9/1989 Horsten ...................... 714/704
5,717,510 A    2/1998 Ishikawa et al.
5,793,432 A * 8/1998 Mishima et al. ......... 375/240.01
5,991,477 A * 11/1999 Ishikawa et al. .............. 385/24

FOREIGN PATENT DOCUMENTS

| JP | 5-235917 | 9/1993 |
| JP | 8-321805 | 12/1996 |
| JP | 9-18408 | 1/1997 |
| JP | 9-326755 | 12/1997 |

* cited by examiner

Primary Examiner—Dieu-Minh Le
(74) Attorney, Agent, or Firm—Staas & Halsey LLP (57) ABSTRACT

Chromatic dispersion in a transmission channel is optimized during operation of an optical communication system. An adder (42) adds a rectangular-wave voltage output by an oscillator (32) to a center value output by a center value setting section (40), and supplies the result as a control voltage to a variable dispersion compensator (16), thereby applying a perturbation to the chromatic dispersion of the transmission channel. Counters (34 and 36) count the number of errors occurring when the perturbation is applied in respectively designated directions, and their count values are compared in a comparator (38). The result of the comparison from the comparator (38) is supplied to the center value setting section (40), and the center of the perturbation is changed in the direction toward fewer or no errors.

20 Claims, 13 Drawing Sheets

METHOD AND APPARATUS FOR CHROMATIC DISPERSION EQUALIZATION

CROSS-REFERENCE TO RELATED APPLICATIONS

This application is based upon and claims priority of Japanese Patent Application No. 10-70654, filed Mar. 19, 1998, the contents being incorporated therein by reference, and a continuation of PCT/JP99/01424.

TECHNICAL FIELD

The present invention relates to optimizing the amount of dispersion in an optical communication system.

With the widespread use of the Internet and image communication and other services, there is a need to increase the capacity of optical communication systems. One way to achieve this is by increasing the transmission speed. Currently, 10-Gb/s optical communication systems are in the stage of commercial operation, and research into 40-Gb/s optical communication systems is under way. The present invention relates to dispersion amount control in a high-speed optical communication system.

BACKGROUND ART

The speed of light travelling through optical fiber varies subtly with wavelength (frequency) (this phenomenon is called chromatic dispersion). A light pulse contain a plurality of frequency components; if it experiences chromatic dispersion, the transmitted waveform distorts depending on the amount of dispersion (dispersion×distance) since different frequency components travel at different speeds. This imposes a limit on the amount of dispersion tolerable in transmission, and its value is proportional to 1/(transmission speed)$^2$ and thus decreases as the transmission speed increases. Chromatic dispersion is minimum at a zero dispersion wavelength; when using a wavelength at which chromatic dispersion is large, it is practiced to employ a system configuration in which a dispersion compensator having an inverse dispersion characteristic is inserted to reduce the total amount of dispersion.

The amount of dispersion can also vary during system operation. Since the zero dispersion wavelength of a fiber has temperature dependence, its dispersion value changes depending on the conditions of the environment where the fiber is laid, and also changes with time due to the change over time of the laser wavelength of the transmitter used.

In 10-Gb/s systems for which the tolerable amount of dispersion is relatively large, there is no problem if the compensation amount of the dispersion compensator is fixed once it is initially set; however, in the case of 40-Gb/s systems, the dispersion tolerance is reported to be as small as 30 ps/nm (Ooi et al., 1997 General Convention of The Institute of Electronics, Information and Communication Engineers, B-10-165). Accordingly, the amount of dispersion must be adjusted even during system operation.

For example, if the variation of transmission wavelength over time is ±1 nm (2 nm in width), the temperature dependence of the zero dispersion wavelength of SMF (single-mode fiber) is 0.03 nm/° C., the variation of the environmental temperature of the fiber transmission channel is 50° C., the transmission distance is 100 km, and the dispersion slope is 0.07 ps/nm$^2$/km, then the amount of dispersion varies by 25 ps/nm=(2+0.03+50)×0.07×100.

A. Sano et al., ECOC '96 Technical Digests Tud. 3.5, proposes a method that monitors the magnitude of a clock component to optimize the amount of dispersion during system operation.

Since the method of judging whether the amount of dispersion is optimum by monitoring the magnitude of the clock component relies on the shape of signal waveform, it may not be able to address the problem if the waveform is distorted due to a non-linear effect such as SPM or if there is a variation in the shape of the transmitted waveform.

DISCLOSURE OF THE INVENTION

It is, accordingly, an object of the present invention to provide a method and apparatus for adjusting the dispersion value of a transmission channel to an optimum value during system operation.

According to the present invention, there is provided a chromatic dispersion equalization method comprising the steps of: encoding a signal with an error-correcting code as a channel code; transmitting the encoded signal on a transmission channel; applying a perturbation to chromatic dispersion in the transmission channel; receiving the signal transmitted through the transmission channel; detecting and correcting an error by decoding the received signal; and changing the center of the perturbation in a direction towards fewer or no errors.

According to the present invention, there is also provided a chromatic dispersion equalization apparatus comprising: an encoder for encoding a signal with an error-correcting code as a channel code; a transmitter for transmitting the encoded signal on a transmission channel; means for applying a perturbation to chromatic dispersion in the transmission channel; a receiver for receiving the signal transmitted through the transmission channel; a decoder for detecting and correcting an error by decoding the received signal; and a controller for changing the center of the perturbation in a direction towards fewer or no errors.

BEST MODE FOR CARRYING OUT THE INVENTION

Figure 1:
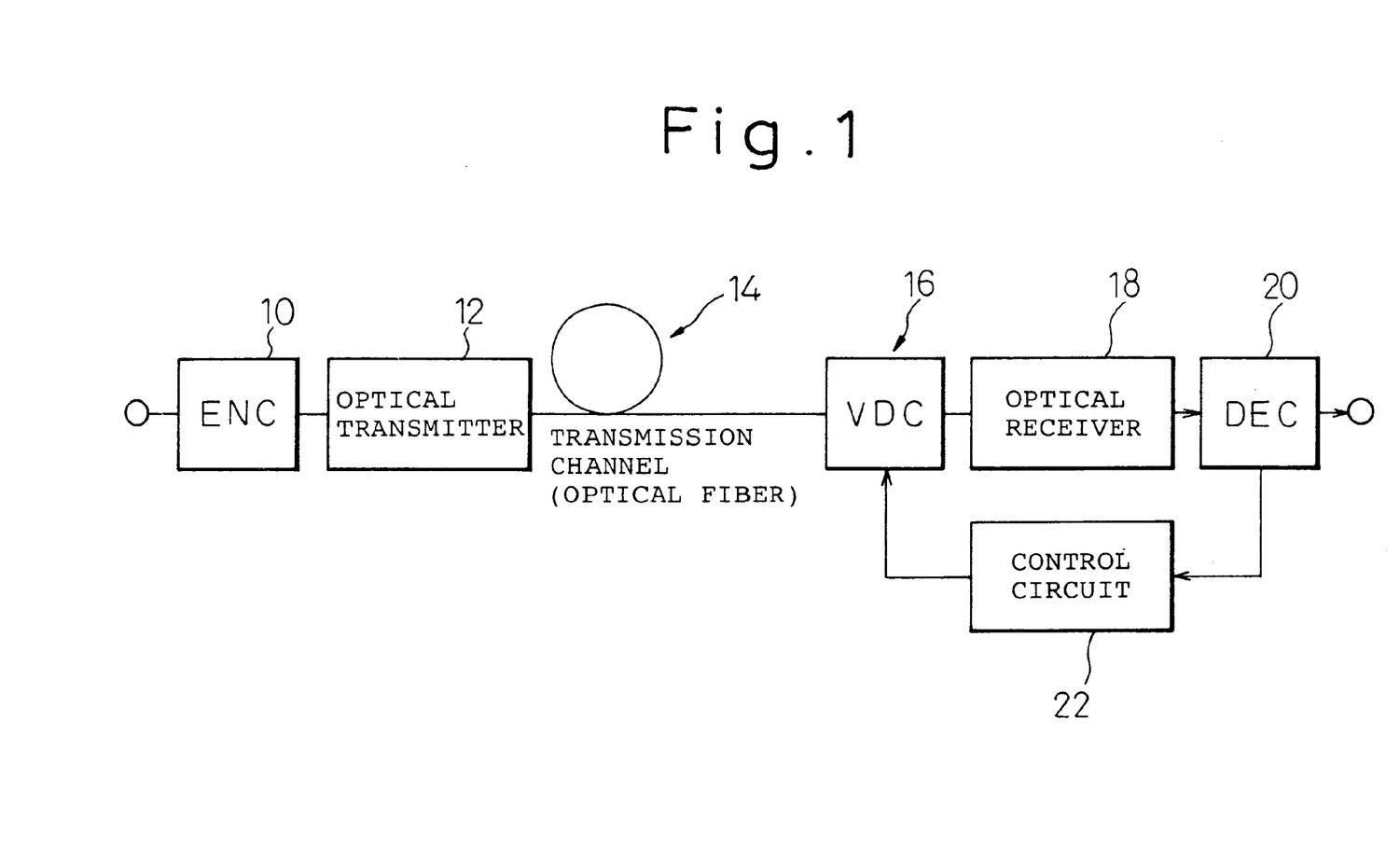
FIG. 1 is a block diagram showing a first embodiment of the present invention.

FIG. 1 is a block diagram showing one embodiment of the present invention. Data to be transmitted are encoded with a channel code by an encoder 10. A code having an error detection and correction capability, such as a Reed-Solomon code, as defined, for example, in ITU-T Recommendation G.975, is employed as the channel code.

An error-correcting code not involving an increase in transmission speed, as disclosed in Japanese Patent Application No. 4-231067, can also be used. In an optical transmitter 12, the output of the encoder 10 is converted into an optical signal for transmission onto a transmission channel 14. A variable dispersion compensator 16 is inserted in series with the transmission channel 14. Those shown in FIGS. 19 to 22 in Japanese Patent Application No. 9-224056 can each be used as the variable dispersion compensator.

An optical receiver 18 converts the received optical signal into an electrical signal. A decoder 20 detects and corrects any errors in the received signal.

Figure 2:
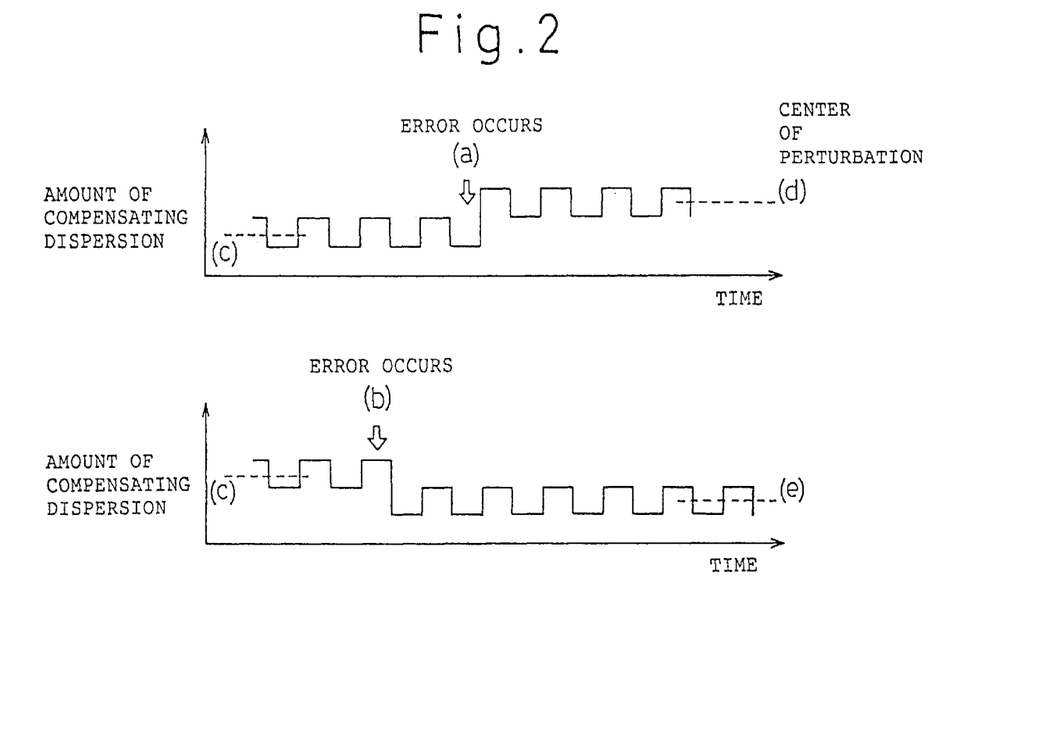
FIG. 2 is a waveform diagram showing the operation of the system of FIG. 1.

A control circuit 22, by causing the amount of compensating dispersion in the variable dispersion compensator 16 to vary in rectangular wave-like fashion, as shown in FIG. 2, applies a perturbation in a direction that increases the amount of dispersion alternately with a perturbation in a direction that reduces the amount of dispersion. If an error occurs, the center of the perturbation is shifted in the direction opposite to the direction of the perturbation being applied at that instant in time. For example, if an error occurs at time (a) when the perturbation in the direction that reduces the amount of dispersion is being applied, as shown in FIG. 2, the center of the perturbation is shifted from (c) to (d). Conversely, if an error occurs at time (b) when the perturbation in the direction that increases the amount of dispersion is being applied, the center of the perturbation is shifted from (c) to (e).

Figure 3:
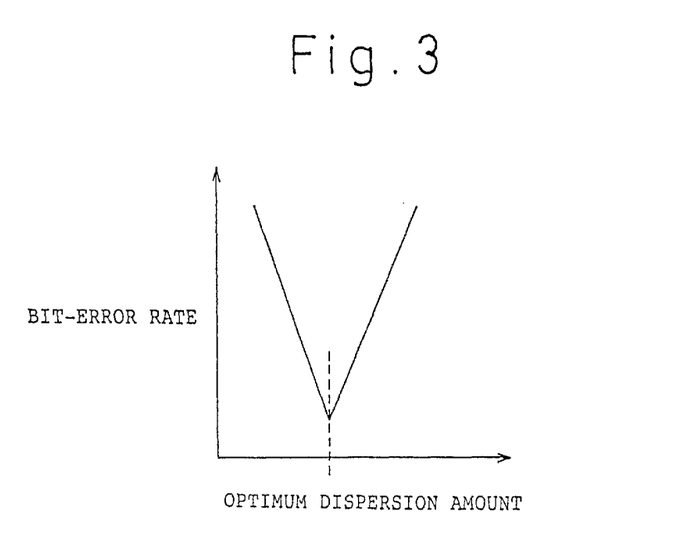
FIG. 3 is a graph showing the relationship between bit-error rate and dispersion compensation amount.

Over time, the error rate becomes the smallest at the optimum value of the amount of dispersion, as shown in FIG. 3, the error rate increasing as the amount of dispersion deviates in either direction; accordingly, by performing control as described above, the amount of dispersion can be controlled to the optimum value. Any error that occurs is properly corrected by the decoder 20.

Rather than shifting the center of the perturbation each time an error occurs, provisions may be made to count the number of errors occurring when the perturbation of each direction is being applied and to shift the center of the perturbation in the direction where there occurred fewer errors.

Figure 4:
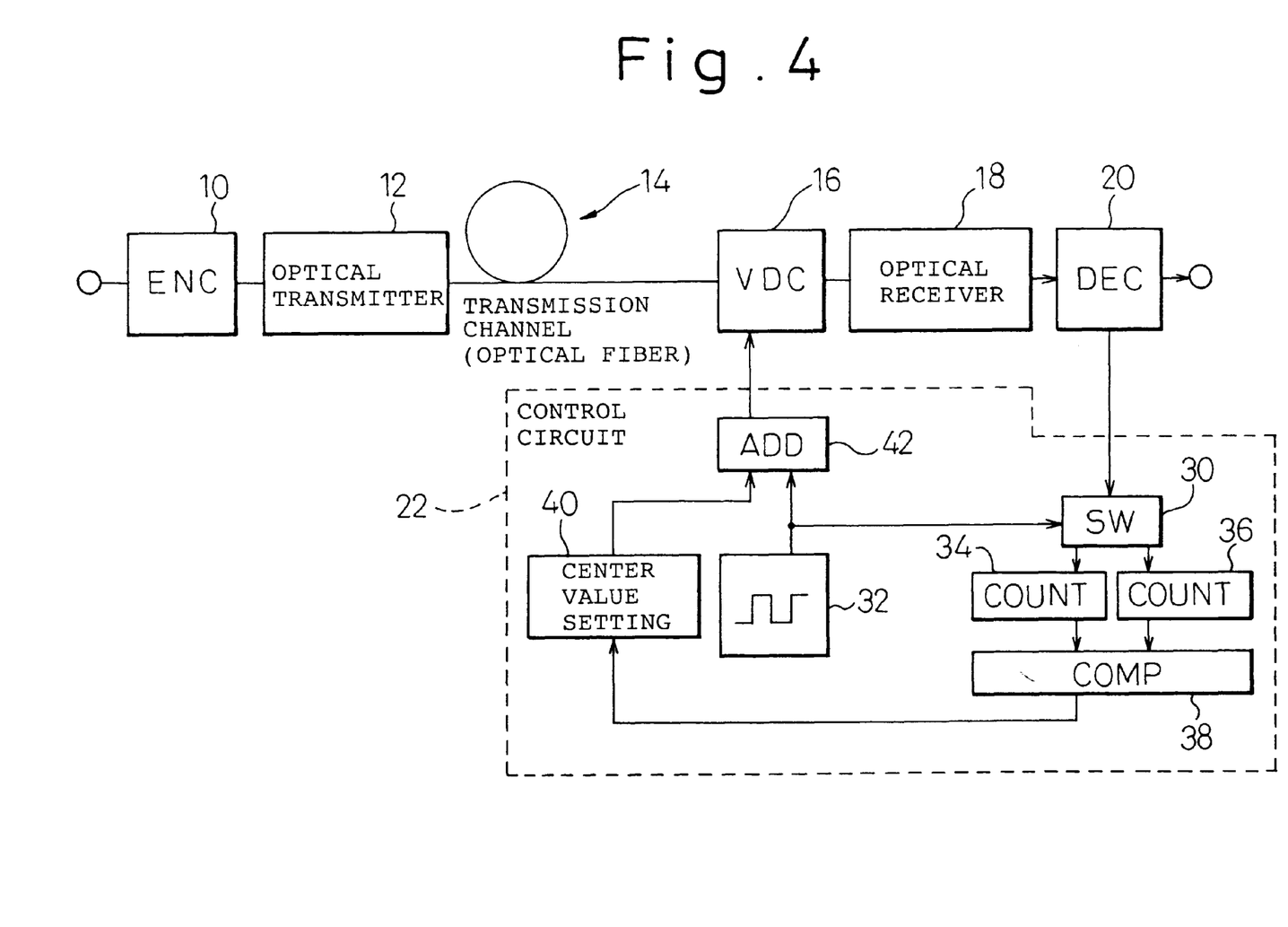
FIG. 4 is a block diagram:showing one example of the detailed configuration of a control circuit 22 in FIG. 1.

FIG. 4 shows the detailed configuration of the control circuit 22 in the latter case. The same constituent elements as those in FIG. 1 will be designated by the same reference numerals, and will not be described in detail here.

A switch 30, being controlled by a rectangular wave output from an oscillator 32, reports errors detected by the decoder 20 to counters 34 and 36 alternately. Each counter 34, 36 counts the number of reported errors. A comparator 38 compares the count values of the counters 34 and 36 and reports the result to a center value setting section 40. The center value setting section 40 changes the center value of the perturbation in accordance with the result of the comparison supplied from the comparator 38. An adder 42 adds the rectangular wave output by the oscillator 32 to the output of the center value setting section 40, and supplies the result as a dispersion amount control signal to the variable dispersion compensator 16.

Figure 5:
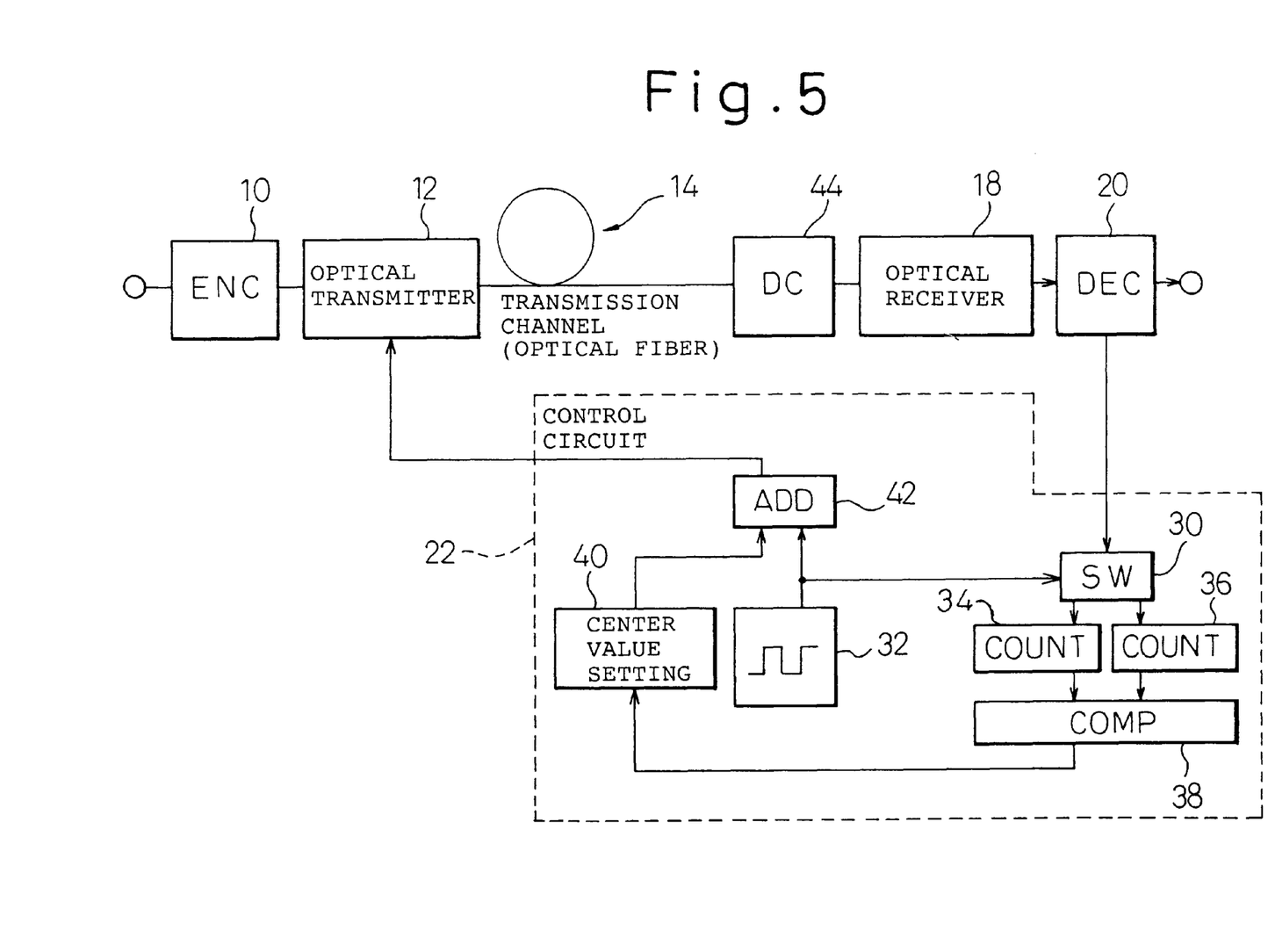
FIG. 5 is a block diagram showing a modified example of the system of FIG. 4.

As shown in FIG. 5, the variable dispersion compensator 16 may be replaced by a dispersion compensator 44 with a fixed dispersion amount, in which case the amount of dispersion is varied by varying the wavelength of the signal light.

Figure 6:
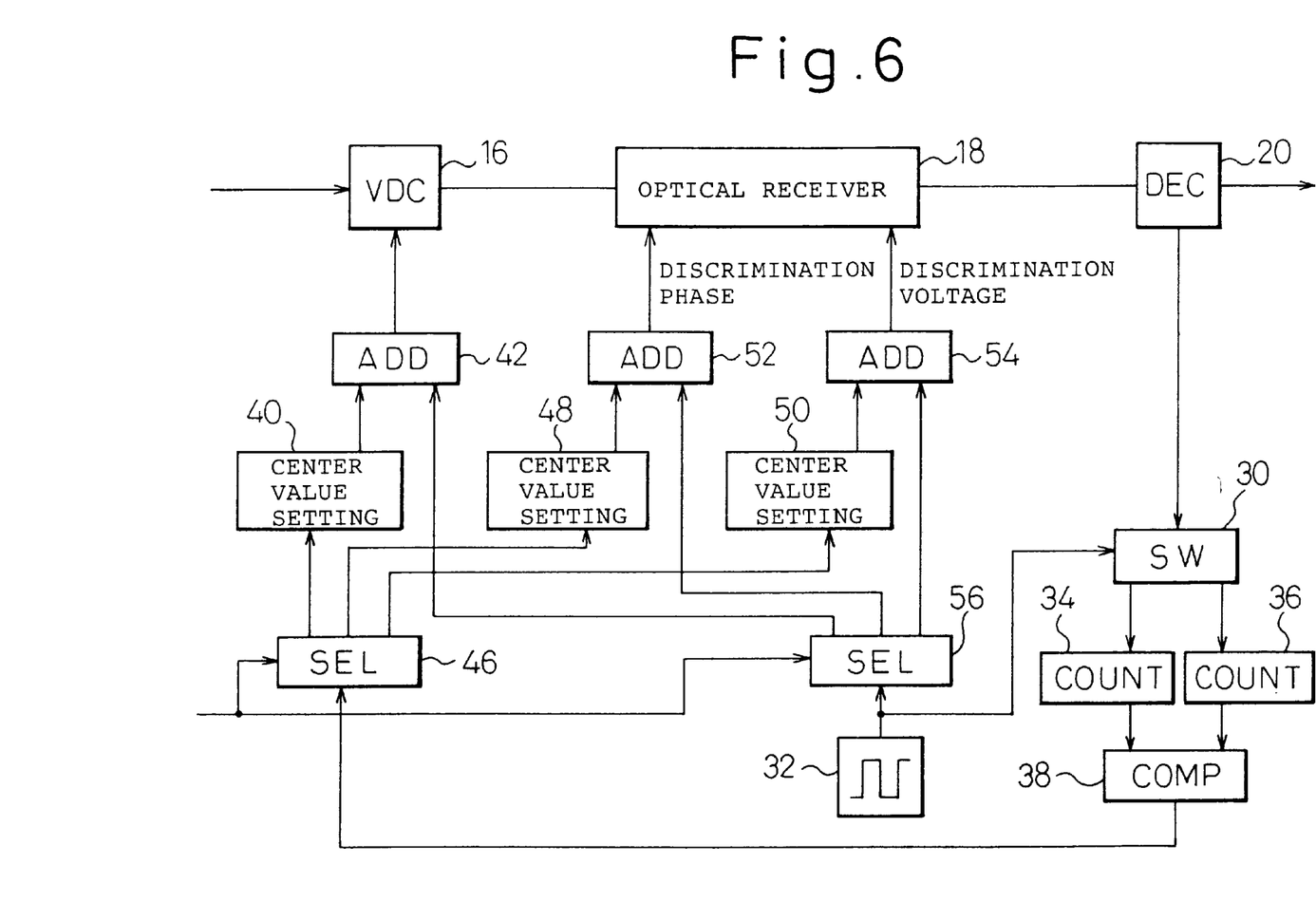
FIG. 6 is a block diagram showing a second embodiment of the present invention.

FIG. 6 shows a second embodiment of the present invention. In this embodiment; in addition to optimizing the chromatic dispersion of the transmission channel, discrimination phase and discrimination voltage in the optical receiver 18 are optimized in a time-division fashion using a similar control method. The same constituent elements as those in FIG. 4 will be designated by the same reference numerals, and will not be described in detail here.

A selector 46 supplies the result of the comparison from the comparator 38 not only to the center value setting section 40 but also to center value setting sections 48 and 50 in time-division fashion. The center value setting sections 48, 50 and adders 52, 54 are identical in configuration to the center value setting section 40 and the adder 42, respectively, but the output of the adder 52 is supplied to the optical receiver 18 as a control voltage for the discrimination phase, while the output of the adder 54 is supplied as the discrimination voltage to the optical receiver 18.

A selector 56 is controlled synchronously with the selector 46. That is, at the time when the result of the discrimination from the comparator 38 is supplied to the center value setting section 40, the rectangular-wave voltage from the oscillator 32 is supplied to the adder 42 to apply a perturbation to the amount of dispersion compensation. When the selector 46 is switched so that the result of the discrimination from the comparator 38 is supplied to the center value setting section 48, the selector 56 is synchronously switched so that the rectangular-wave voltage is supplied to the adder 52 which thus applies a perturbation to the discrimination phase. At this time, since the rectangular-wave voltage is not supplied to the adder 42, the center value of the perturbation is output from the adder 42. When the selector 46 is switched so that the result of the discrimination from the comparator 38 is supplied to the center value setting section 50, the selector 56 is synchronously switched so that the rectangular wave voltage is now supplied to the adder 54 which thus applies a perturbation to the discrimination voltage. At this time, the center value of the perturbation is output from the adder 52.

Figure 7:
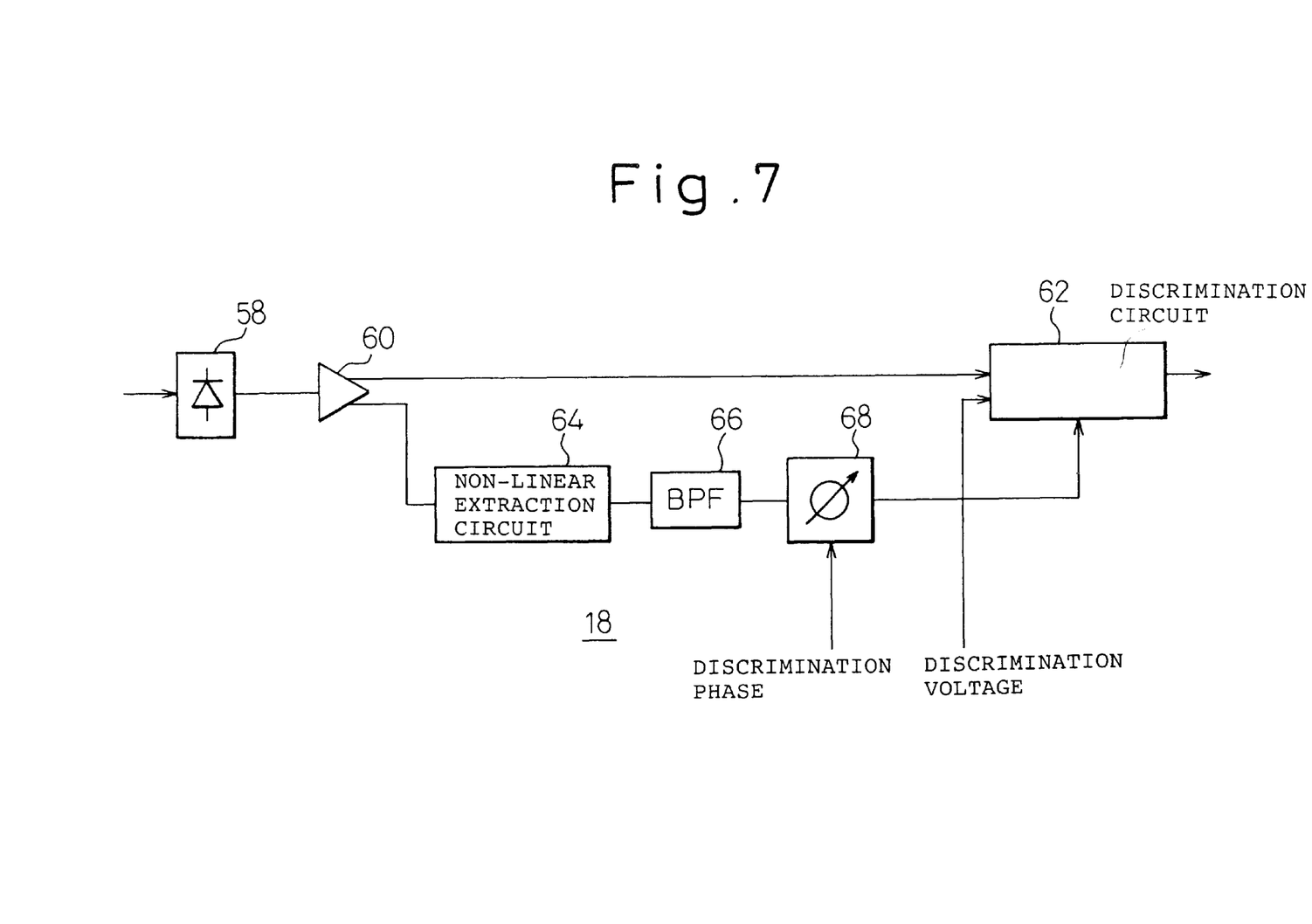
FIG. 7 is a circuit block diagram showing the detailed configuration of an optical receiver 18 in FIG. 6.

FIG. 7 shows the detailed configuration of the optical receiver 18 in FIG. 6. The received optical signal is converted by an optical detector 58 into an electrical signal, which is then amplified by an amplifier 60. One of two outputs of the amplifier 60 is fed to a discrimination circuit 62 for discrimination. A non-linear extraction circuit 64 generates a clock component by non-linear extraction from the other output of the amplifier 60. The clock component extracted by the non-linear extraction circuit 64 is passed through a band-pass filter 66, phase adjusted by a variable phase shifter 68, and supplied to the discrimination circuit 62 as a clock signal that provides discrimination timing.

The output of the adder 52 (FIG. 6) is supplied to the variable phase shifter 68 as a signal for controlling the amount of phase shift. The output of the adder 54 (FIG. 6) is supplied to the discrimination circuit 62 to provide a discrimination threshold.

Figure 8:
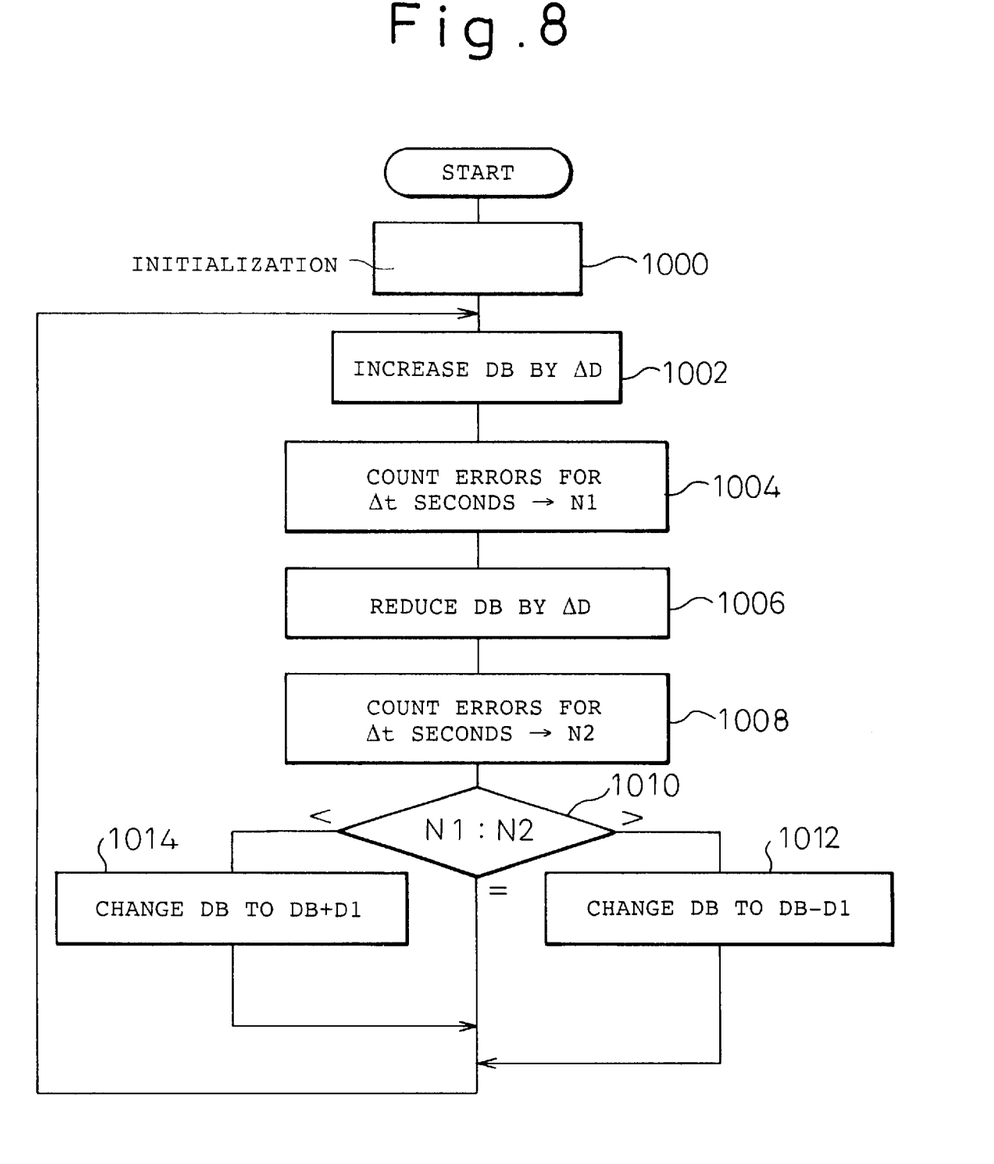
FIG. 8 is a flowchart illustrating the operation when the control of FIG. 4 is implemented in software.

FIG. 8 is a flowchart illustrating the operation when the control circuit 22 of FIG. 4 is implemented using a computer and software for the same.

In FIG. 8, initialization is performed by one of the following methods (1) to (3) (step 1000).

(1) The amount of dispersion in the variable dispersion compensator 16 is swept across the full variable range in steps of a prescribed width (for example, about 5 to 10 ps in the case of 40 Gb/s), an error rate is measured for each step (the measurement time is, for example, one second), and the amount of dispersion in the variable dispersion compensator 16 is set equal to the amount of dispersion at which the bit-error rate was the lowest.

(2) Instead of measuring the bit-error rate in (1), the clock component extracted from the optical signal in the optical receiver 18 is measured, and the amount of dispersion in the variable dispersion compensator 16 is set equal to the amount of dispersion that maximizes the measured amount.

(3) While monitoring the optical communication, bit-error rate, or clock component, personnel operating the system set the amount of dispersion in the variable dispersion compensator 16 equal to the amount of dispersion with which good optical communication or bit-error rate characteristics or the largest clock component can be obtained.

Next, the amount of dispersion, DB, of the variable dispersion compensator 16 is increased by $\Delta D$ (step 1002), and the number of errors is counted for $\Delta t$ seconds and the result is taken as N1 (step 1004). Next, DB is reduced by $\Delta D$ (step 1006), and the number of errors is counted for $\Delta t$ seconds and the result is taken as N2 (step 1008). N1 and N2 are compared (step 1010), and if N1 is larger than N2, DB is changed to DB−D1 (step 1012), and the process returns to step 1002. If N1 is smaller than N2, DB is changed to DB+D1 (step 1014), and the process returns to step 1002. If N1 is substantially equal to N2, the process returns to step 1002 without changing DB.

Here, $\Delta t$ is, for example, 10 msec to 1 sec. The time may be set longer than 1 sec. but in that case, it takes a longer time to reach a stable state when the optimum value changes. D1 is a value smaller than the dispersion tolerance at the target error rate. For example, when a BER (error rate) of $10^{-5}$ or less is assumed for 40 Gb/s, a value within the range of 0.5 to 2 ps/nm is appropriate. $\Delta D$ is chosen to be approximately equal to D1.

In the above example, D1 and $\Delta D$ have been described as being fixed values, but D1 or D1 and $\Delta D$ may be varied according to the measured value of the error count. In that case, if the number of errors is large, the value of D1, $\Delta D$ is increased, and if the number of errors is small, the value is reduced. This improves the settling speed to the optimum value. As an example, denoting E=number of errors/time, when $10^3 < E \leq 10^7$, D1 is set to about 5 ps/nm (40 Gb/s) or 80 ps/nm (10 Gb/s); when $1 < E \leq 10^3$, D1 is set to about 2 ps/nm; (40 Gb/s) or 30 ps/nm (10 Gb/s); and when $E \leq 1$, D1 is set to about 0.5 ps/nm (40 Gb/s) or 10 ps/nm (10 Gb/s).

Alternatively, $\Delta t$ may be varied according to the error rate, for example, by increasing $\Delta t$ when the number of errors per unit time (error rate) is small. In this case, it is preferable to place an upper limit on $\Delta t$. For example, when $10^{-5} \leq$ BER, $\Delta t$ is set to 10 msec; when $10^{-9} \leq$ BER $< 10^{-5}$, $\Delta t$ is set to 100 msec; when $10^{-12} \leq$ BER $< 10^{-9}$, $\Delta t$ is set to 1 sec; and when BER $< 10^{-12}$, $\Delta t$ is set to 10 sec. This method may be combined with the above method of varying the value of D1, $\Delta D$.

Figure 9:
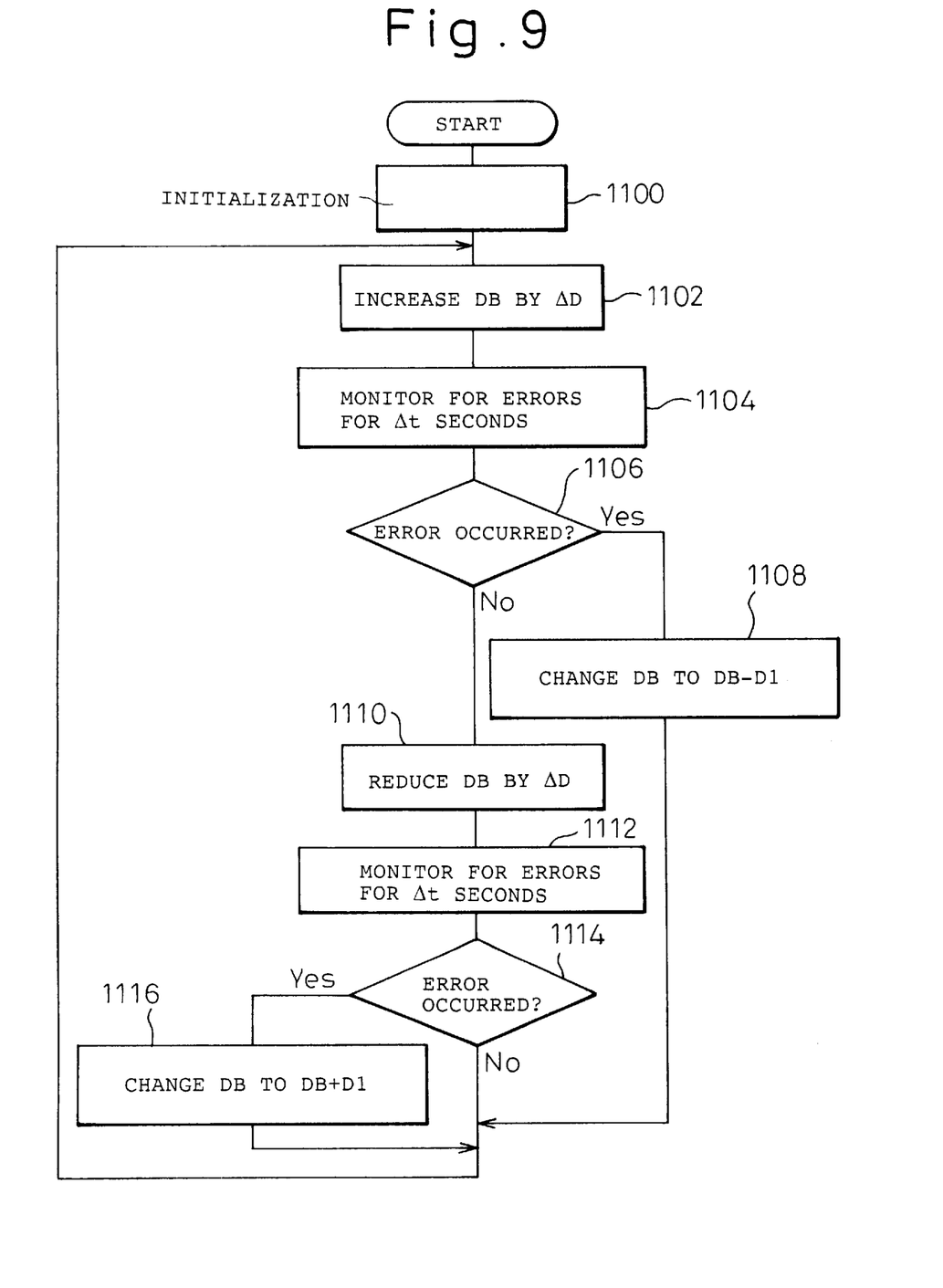
FIG. 9 is a flowchart illustrating the operation when the control of FIG. 1 is implemented in software.

FIG. 9 is a flowchart illustrating the operation when the control circuit 22 described with reference to FIGS. 1 to 3 is implemented using a computer and software for the same. This method can be applied when the frequency of occurrence of errors is low.

In FIG. 9, initialization in step 1100 is the same as the initialization performed in step 1000 in FIG. 8. In step 1102, the amount of dispersion, DB, of the variable dispersion compensator 16 is increased by $\Delta D$, and monitoring is performed for the occurrence of errors for $\Delta t$ seconds (step 1104). If an error occurs within $\Delta t$ seconds (step 1106), DB is changed to DB−D1 and the process returns to step 1102. Next, DB is reduced by $\Delta D$ (step 1110), and monitoring is performed for the occurrence of errors for $\Delta t$ seconds (step 1112); if an error occurs (step 1114), DB is changed to DB+D1 and the process returns to step 1102.

In this case also, $\Delta t$ may be varied according to the error rate, with an upper limit imposed on $\Delta t$. For example, when $10^{-10} \leq$ BER $< 10^{-7}$, $\Delta t$ is set to 1 $\mu$sec; when $10^{-11} \leq$ BER $< 10^{-10}$, $\Delta t$ is set to 10 msec; when $10^{-12} \leq$ BER $< 10^{-11}$, $\Delta t$ is set to 100 msec; and BER $\leq 10^{-12}$, $\Delta t$ is set to 1 sec. When BER $\geq 10^{-7}$, this method cannot be applied.

Figure 10:
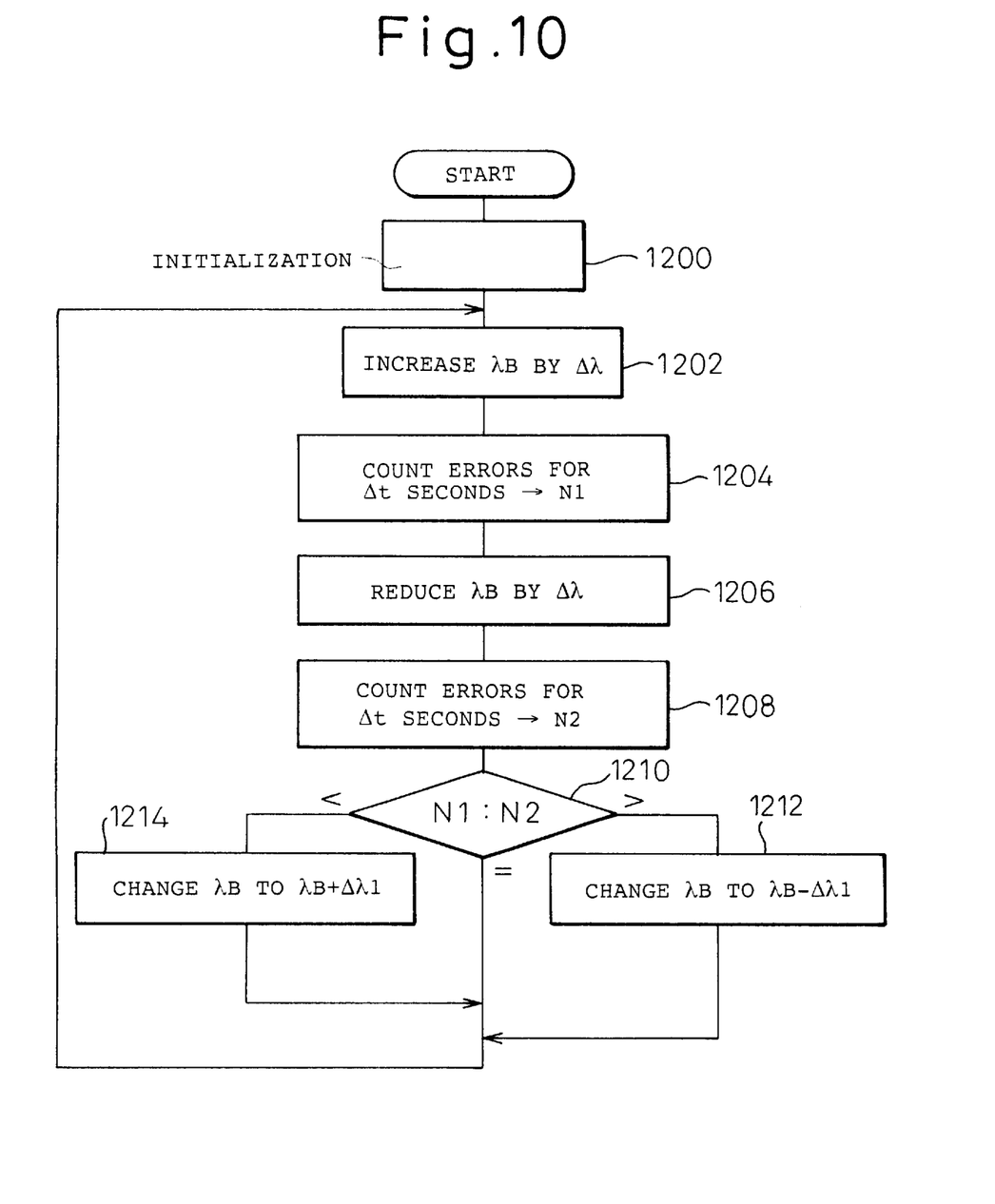
FIG. 10 is a flowchart illustrating the operation when the control of FIG. 5 is implemented in software.

FIG. 10 is a flowchart illustrating the operation when the control circuit 22 of FIG. 5 is implemented using a computer and software for the same. The process is substantially the same as that shown in FIG. 8, except that DB is replaced by wavelength $\lambda$B, $\Delta D$ by $\Delta\lambda$, and D1 by $\Delta\lambda 1$. Assuming, for example, 80-km transmission at 40 Gb/s, a second-order coefficient of 0.05 ps/nm²/km, and a BER of $10^{-15}$ or less, $\Delta\lambda 1$ is 0.1 to 0.5 nm as a value corresponding to the dispersion amount of 0.5 to 2 ps/nm.

If $\Delta\lambda 1$ or $\Delta\lambda 1$ and $\Delta\lambda$ are varied according to the error count, for example, by increasing the value of $\Delta\lambda 1$, $\Delta\lambda$ when the error count is large and reducing it when the error count is small, then the settling speed to the optimum value can be improved. For example, in the above-stated conditions, when $10^3 < E \leq 10^7$, $\Delta\lambda 1$ is set to 1.25 nm (40 Gb/s) or 20 nm (10 Gb/s); when $1 < E \leq 10^3$, $\Delta\lambda 1$ is set to 0.5 nm (40 Gb/s) or 7.5 nm.(10 Gb/s); and when $E \leq 1$, $\Delta\lambda 1$ is set to 0.13 nm (40 Gb/s) or 2.5 nm (10 Gb/s).

Alternatively, $\Delta t$ may be varied according to the error rate, for example, by increasing $\Delta t$ when the error rate is low; in that case, an upper limit may be imposed on $\Delta t$. For example, when $10^{-5} \leq$ BER, $\Delta t$ is set to 10 msec; when $10^{-9} \leq$ BER $< 10^{-5}$, $\Delta t$ is set to 100 msec; when $10^{-12} \leq$ BER $< 10^{-9}$, $\Delta t$ is set to 1 sec; and when BER $< 10^{-12}$, $\Delta t$ is set to 10 sec. This method may be combined with the above method of varying the value of $\Delta\lambda 1$, $\Delta\lambda$.

Figure 11:
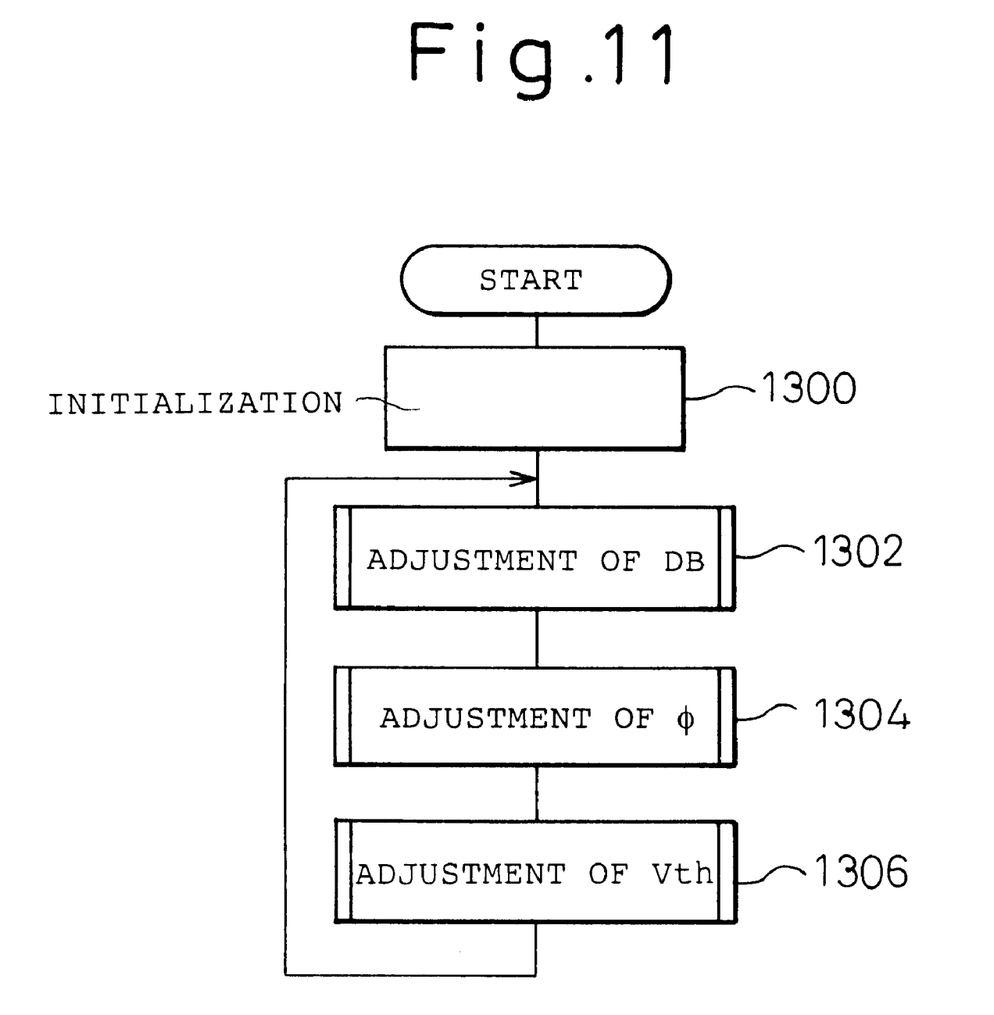
FIG. 11 is a flowchart illustrating the operation when the control of FIG. 6 is implemented in software.

FIG. 11 is a flowchart illustrating the operation when the control of FIG. 6 is implemented using a computer and software for the same.

In the initialization in step 1300, the amount of dispersion is set in accordance with one of the previously described initialization methods (1) to (3). As for the discrimination phase and discrimination voltage, for example, the discrimination phase is set so as to coincide with the midpoint of one symbol period, while the discrimination voltage is set at the midpoint of the waveform amplitude.

Figure 12:
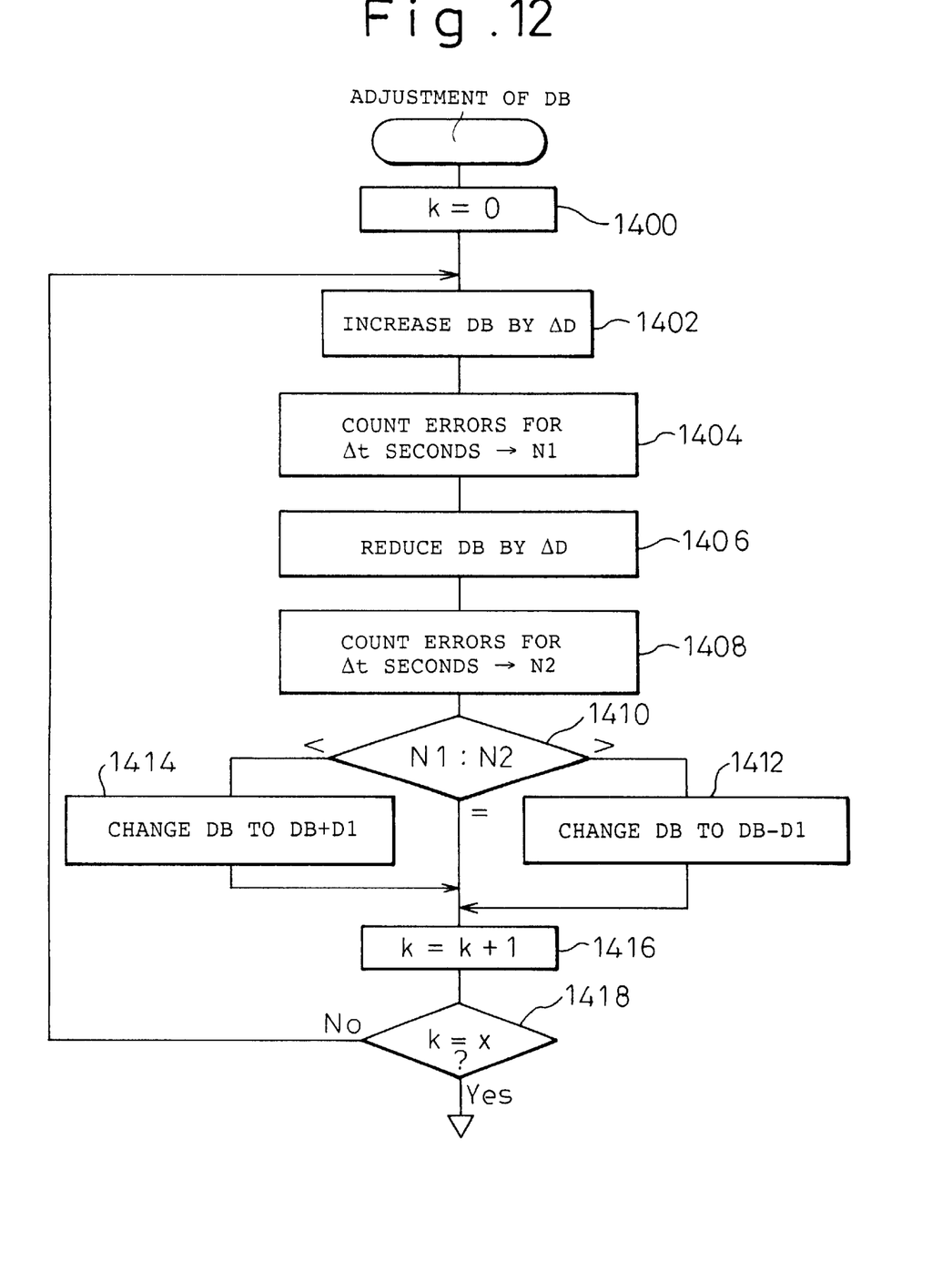
FIG. 12 is a flowchart illustrating the adjustment of DB in FIG. 11.
Figure 13:
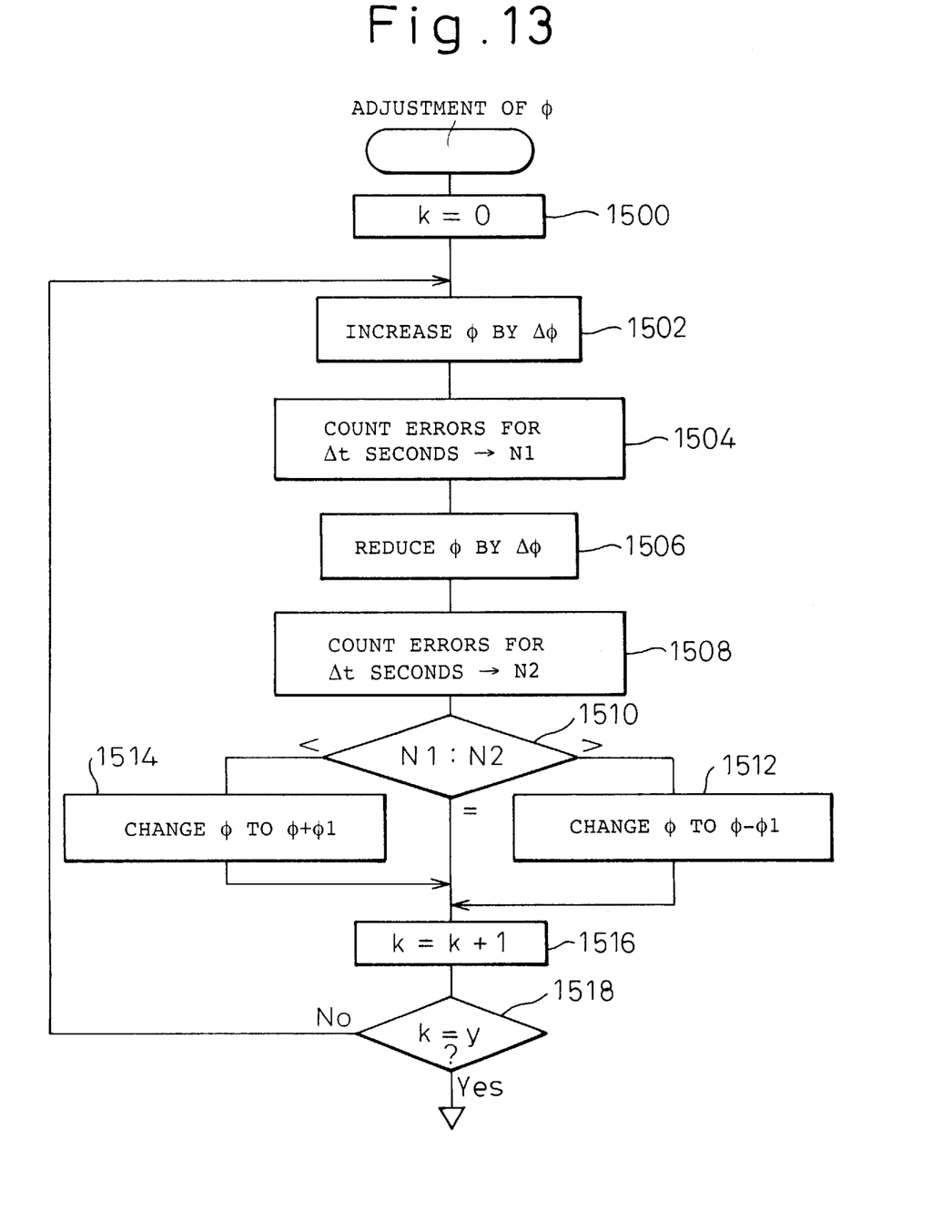
FIG. 13 is a flowchart illustrating the adjustment of φ in FIG. 11.

Next, the adjustment of the dispersion amount DB (step 1302), the details of which are illustrated in FIG. 12, the adjustment of the discrimination phase $\phi$ (step 1304), the details of which are illustrated in FIG. 13, and the adjustment of the discrimination voltage Vth (step 1306), the details of which are illustrated in FIG. 13, are carried out repetitively.

FIG. 12 shows the details of the adjustment of DB. In FIG. 12, the following process is repeated x times using parameter k. DB is increased by $\Delta D$ (step 1402), and the number of errors is counted for $\Delta t$ seconds and the result is taken as N1 (step 1404). Next, DB is reduced by $\Delta D$ (step 1406), and the number of errors is counted for $\Delta t$ seconds and the result is taken as N2 (step 1408); then, N1 and N2 are compared (step 1410), and if N1 is larger than N2, DB is changed to DB−D1 (step 1412). If N1 is smaller than N2, DB is changed to DB+D1 (step 1414). If N1 is substantially equal to N2, DB is not changed.

FIG. 13 shows the details of the adjustment of φ. In FIG. 13, the following process is repeated y times using parameter k. φ is increased by Δφ (step 1502), and the number of errors is counted for Δt seconds and the result is taken as N1 (step 1504). Next, φ is reduced by Δφ (step 1506), and the number of errors is counted for Δt seconds and the result is taken as N2 (step 1508); then, N1 and N2 are compared (step 1510), and if N1 is larger than N2, φ is changed to φ−φ1 (step 1512). If N1 is smaller than N2, φ is changed to φ+φ1 (step 1514). If N1 is substantially equal to N2, φ is not changed.

Figure 14:
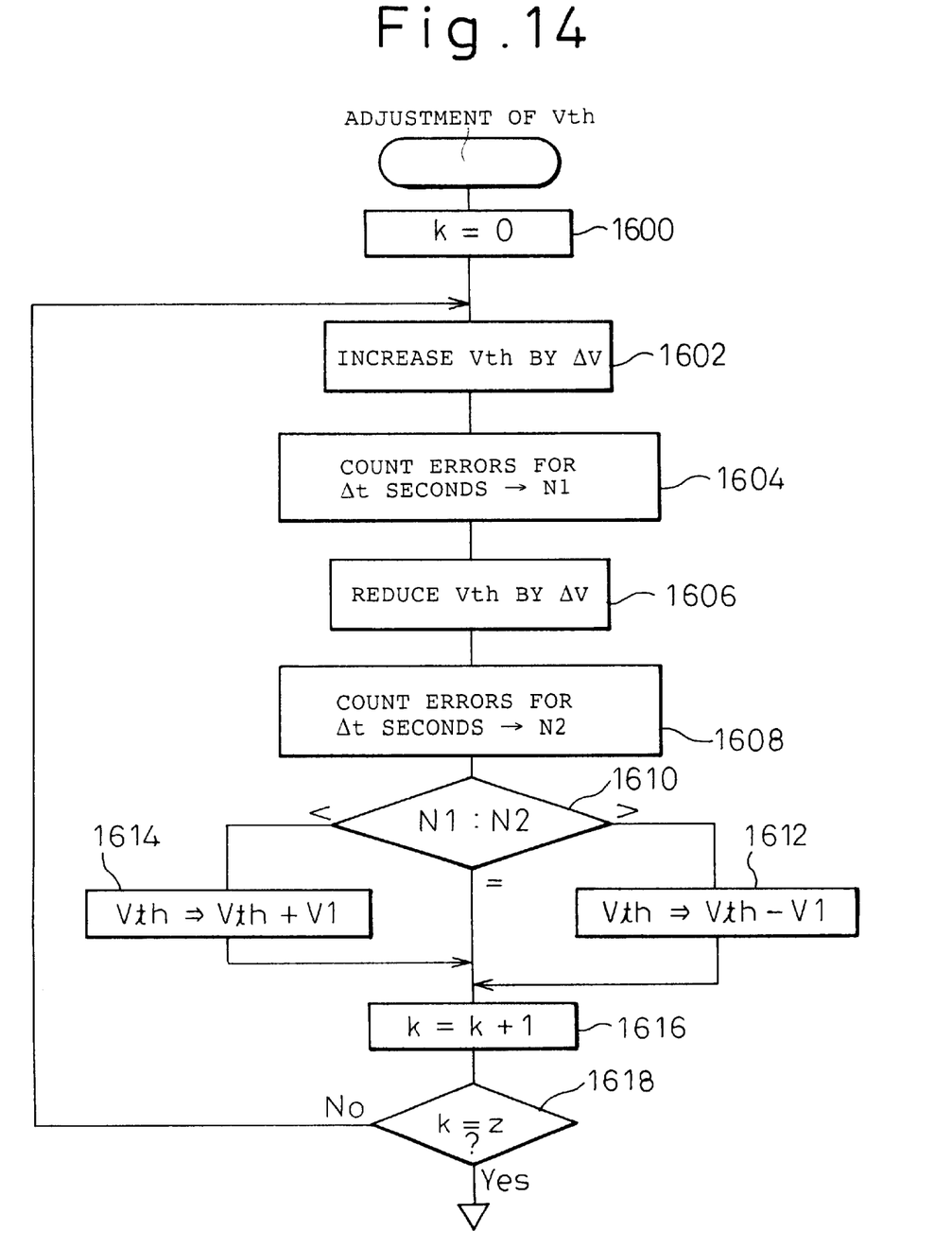
FIG. 14 is a flowchart illustrating the adjustment of Vth in FIG. 11.

FIG. 14 shows the details of the adjustment of Vth. In FIG. 14, the following process is repeated z times using parameter k. Vth is increased by ΔV (step 1602), and the number of errors is counted for Δt seconds and the result is taken as N1 (step 1604). Next, Vth is reduced by ΔV (step 1606), and the number of errors is counted for Δt seconds and the result is taken as N2 (step 1608); then, N1 and N2 are compared (step 1610), and if N1 is larger than N2, Vth is changed to Vth+V1 (step 1612). If N1 is smaller than N2, Vth is changed to Vth+V1 (step 1614). If N1 is substantially equal to N2, Vth is not changed.

Here, Δt is set to 10 msec to 1 sec. The time can be set longer than 1 sec. but in that case, it takes a longer time to reach a stable state. D1 is a value smaller than the dispersion tolerance at the target error rate; for example, when a BER of $10^{-5}$ or less is assumed for 40 Gb/s, D1 is 0.5 to 2 ps/nm. ΔD is a value approximately equal to D1. φ1 is preferably at 1.8 to 3.6 degrees, and Δφ is chosen to be approximately equal to φ1. V1 is preferably within the range of (amplitude voltage)/100 to (amplitude voltage)/200, and ΔV is chosen to be approximately equal to V1. x, y, and z are integers not smaller than 1.

Alternatively, D1 or D1 and ΔD, φ1 or φ1 and Δφ, and V1 or V1 and ΔV, respectively, may be varied according to the error count, for example, by increasing the respective values D1, ΔD or φ1, Δφ or V1, ΔV when the error count is large, and reducing the values when the error count is small. This improves the settling speed. For example, when $10^{-3} < E \leq 10^7$, D1 is set to about 5 ps/nm (40 Gb/s) or 80 ps/nm (10 Gb/s), φ1 is set to 20 degrees, and V1 is set to amplitude/50; when $1 < E \leq 10^3$, D1 is set to about 2 ps/nm (40 Gb/s) or 30 ps/nm (10 Gb/s), φ1 is set to 10 degrees, and V1 is set to amplitude/10; and when $E \leq 1$, D1 is set to about 0.5 ps/nm (40 Gb/s) or 10 ps/nm (10 Gb/s), φ1 is set to 3 degrees, and V1 is set to amplitude/200.

What is claimed is:

1. A chromatic dispersion equalization method comprising:
   (a) encoding a signal with an error-correcting code as a channel code;
   (b) transmitting said encoded signal out onto a transmission channel;
   (c) applying a perturbation to chromatic dispersion in said transmission channel;
   (d) receiving said signal transmitted through said transmission channel;
   (e) detecting and correcting an error by decoding said received signal; and
   (f) changing the center of said perturbation in a direction toward fewer or no errors.

2. A method according to claim 1, wherein in step (c), said perturbation is applied to the chromatic dispersion of said transmission channel by varying the amount of dispersion in a variable dispersion compensator inserted in said transmission channel.

3. A method according to claim 2, wherein in step (c), a perturbation is further applied to a discrimination phase for said received signal.

4. A method according to claim 2, wherein in step (c), a perturbation is further applied to a discrimination level for said received signal.

5. A method according to claim 1, wherein in step (c), said perturbation is applied to the chromatic dispersion of said transmission channel by varying signal wavelength.

6. A method according to claim 5, wherein in step (c), a perturbation is further applied to a discrimination phase for said received signal.

7. A method according to claim 5, wherein in step (c), a perturbation is further applied to a discrimination level for said received signal.

8. A method according to claim 1, wherein in step (c), a perturbation is further applied to a discrimination phase for said received signal.

9. A method according to claim 8, wherein in step (c), a perturbation is further applied to a discrimination level for said received signal.

10. A method according to claim 1, wherein in step (c), a perturbation is further applied to a discrimination level for said received signal.

11. A chromatic dispersion equalization apparatus comprising:
   an encoder encoding a signal with an error-correcting code as a channel code;
   a transmitter transmitting said encoded signal out onto a transmission channel;
   a unit applying a perturbation to chromatic dispersion in said transmission channel;
   a receiver receiving said signal transmitted through said transmission channel;
   a decoder detecting and correcting an error by decoding said received signal; and
   a controller changing the center of said perturbation in a direction toward fewer or no errors.

12. An apparatus according to claims 11, wherein said perturbation applying means applies said perturbation to the chromatic dispersion of said transmission channel by varying the amount of dispersion in a variable dispersion compensator inserted in said transmission channel.

13. An apparatus according to claim 12, wherein said perturbation applying means further applies a perturbation to a discrimination phase for said received signal.

14. An apparatus according to claim 12, wherein said perturbation applying means further applies a perturbation to a discrimination level for said received signal.

15. An apparatus according to claim 11, wherein said perturbation applying means applies said perturbation to the chromatic dispersion of said transmission channel by varying signal wavelength.

16. An apparatus according to claim 15, herein said perturbation applying means further applies a perturbation to a discrimination phase for said received signal.

17. An apparatus according to claim 15, wherein said perturbation applying means further applies a perturbation to a discrimination level for said received signal.

18. An apparatus according to claim 6, wherein said perturbation applying means further applies a perturbation to a discrimination phase for said received signal.

19. An apparatus according to claim 18, wherein said perturbation applying means further applies a perturbation to a discrimination level for said received signal.

20. An apparatus according to claim 6, wherein said perturbation applying means further applies a perturbation to a discrimination level for said received signal.

* * * * *

UNITED STATES PATENT AND TRADEMARK OFFICE
CERTIFICATE OF CORRECTION

PATENT NO. : 6,662,317 B2
DATED : December 9, 2003
INVENTOR(S) : Hiroaki Tomofuji It is certified that error appears in the above-identified patent and that said Letters Patent is hereby corrected as shown below:

Column 8,
Line 53, change "herein" to -- wherein --.
Lines 57 and 63, change "6" to -- 11 --.

Signed and Sealed this

Eleventh Day of May, 2004

JON W. DUDAS
*Acting Director of the United States Patent and Trademark Office*